United States Patent [19]

Imai et al.

[11] 4,252,171
[45] Feb. 24, 1981

[54] WITHSTAND-VOLTAGE TIRE

[75] Inventors: Isamu Imai, Kodaira; Kazuo Koyama, Sayama; Mitsuaki Maeda, Hoya, all of Japan

[73] Assignee: Bridgestone Tire Company Limited, Tokyo, Japan

[21] Appl. No.: 969,136

[22] Filed: Dec. 13, 1978

[30] Foreign Application Priority Data

Dec. 14, 1977 [JP] Japan .................. 52/149187

[51] Int. Cl.³ .............. B60C 1/00; C08L 93/04; C08L 7/00; C08L 47/00
[52] U.S. Cl. ............... 152/357 R; 260/27 R; 260/27 BB; 260/42.32; 152/361 R; 525/139
[58] Field of Search ......... 260/844, 845, 846, 27 R, 260/27 BB, 42-32, 727, 756, 761; 152/209 R, 354 R, 357 R, 361 R

[56] References Cited

U.S. PATENT DOCUMENTS

| | | | |
|---|---|---|---|
| 3,370,023 | 2/1968 | Huang et al. | 260/846 |
| 3,983,919 | 10/1976 | Messerly | 260/42.32 |
| 4,011,899 | 3/1977 | Chamberlin | 152/361 R |
| 4,154,277 | 5/1979 | Sato et al. | 260/42.32 |

FOREIGN PATENT DOCUMENTS 2276186  1/1976  France.

OTHER PUBLICATIONS

Kleemann, "Einfuehrung in die Rezeptentwicklung der Gummi Inderstrie," 2nd Ed. Deutscher Verlag fuer Grundstoffindustrie (1966) Leipzig.
Booth, "Gummi, Asbest, Kunststoffe", vol. 29, No. 5, May, 1976, pp. 264–270 and 287.

Primary Examiner—H. S. Cockeram
Attorney, Agent, or Firm—Sughrue, Rothwell, Mion, Zinn and Macpeak

[57] ABSTRACT

A tire having excellent withstand-voltage property, wear resistance and resistance against heat build-up is disclosed. The tire has a tread, at least the contact area of the tread with road surface being made of a rubber composition containing a specifically limited softening agent and a specifically limited carbon black.

6 Claims, 2 Drawing Figures

WITHSTAND-VOLTAGE TIRE

BACKGROUND OF THE INVENTION

1. Field of the Invention

The present invention relates to a tire having an excellent withstand-voltage property, and more particularly relates to a tire having an excellent withstand-voltage property, which has a tread consisting of a rubber composition comprising a rubber and a specifically limited softening agent and a specifically limited carbon black.

2. Description of the Prior Art

Recently, a pneumatic tire is provided to special vehicles, such as vehicles for subway, monorail and the like, in view of noise and ride feeling, and it is well known that the use of such tire is effective.

These special vehicles are driven by an electric power source having a relatively high voltage, and therefore a high voltage is impressed upon the tire, and due to leakage current the tire is eventually damaged and burnt.

In order to solve these drawbacks, there have hitherto been proposed methods for preventing the electrification of tire. In these methods, a tire is made of a conductive rubber composition containing a conductive substance, or a conductive substance, such as metal wire or the like, is embedded in a tire so that the conductive substance is exposed to the tread surface, whereby the conductivity of the tire is improved and the electrification of the tire is prevented by the grounding action of the tire. The use of a tire formed of such conductive rubber composition or of a rubber composition having such conductive substance embedded therein ensures an electric discharge from the charged tire, but deteriorates the wear resistance, ride feeling and other important properties of the tire. Therefore, it has been very difficult to produce a tire suitable for practical use by the above described methods.

SUMMARY OF THE INVENTION

The inventors have noticed the fact that, when a softening agent, such as natural rosin series resin or phenolic resin, is compounded to a rubber, the withstand-voltage property of the rubber is improved, and have sought to provide a withstand-voltage tire having an improved wear resistance, and being free from breakage even under a high voltage and from the heat build-up even in the use of a relatively large amount of the softening agent, have accomplished the present invention.

That is, tire tread is required to have a high wear resistance. In order to satisfy this requirement, it is necessary to use carbon black having a high reinforcing effect in the tread rubber. However, since the withstand-voltage property of carbon black of this kind is poor, the inventors have attempted to improve the withstand-voltage property of a tread rubber by adding a softening agent, such as natural rosin series resin or phenolic resin to the tread rubber in order to compensate for the effect of the carbon black.

Therefore, a feature of the present invention is the provision of a withstand-voltage tire having a tread, at least the contact area of the tread with road surface being made of a rubber composition consisting of 100 parts by weight of a rubber selected from the group consisting of natural rubber, polyisoprene rubber, styrene-butadiene copolymer rubber, polybutadiene rubber and blends thereof, 1–10 parts by weight, preferably 1–5 parts by weight, of at least one of natural rosin series resin and phenolic resin, and 30–90 parts by weight of carbon black having an iodine adsorbability (IA) of more than 83 mg/g to 150 mg/g, preferably 110–150 mg/g, and a dibutyl phthate absorbability (DBP) of 80–120 ml/100 g, preferably 100–120 ml/100 g.

Another feature of the present invention is the provision of a tire having a cap-base structured tread comprising a tread cap and a tread base, said tread cap having a thickness of at least ½ of the thickness of the tread or extending to a position below a line connecting the groove bottoms of tread patterns, and said tread cap being made of the above described rubber composition, and said tread base being made of a rubber composition consisting of 100 parts by weight of a rubber selected from the group consisting of natural rubber, polyisoprene rubber, polybutadiene rubber and blends thereof, 0–3 parts by weight of at least one of natural rosin series resin and phenolic resin, and 20–50 parts by weight, preferably 30–40 parts by weight, of carbon black having an IA of 40–83 mg/g, preferably 30–50 mg/g, and a DBP of 80–120 ml/100 g, preferably 100–120 ml/100 g.

The tire having the above described cap-base structured tread has remarkably improved withstand-voltage property and resistance against heat build-up. When a tread is formed into the above described cap-base structure, the amount of a softening agent to be used in the tread cap can be smaller than that of a softening agent to be used in the tread having an integrated structure, and further the former tread is superior to the latter tread in the resistance against heat build-up.

DESCRIPTION OF THE PREFERRED EMBODIMENT

Figure 1A:
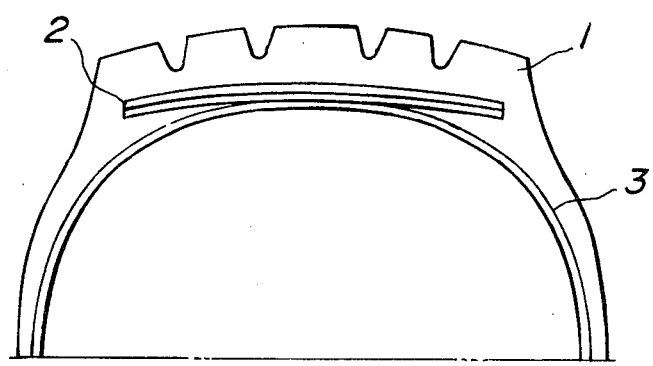
FIG. 1A is a cross-sectional view of a tire provided with a tread having an integrated structure.
Figure 1B:
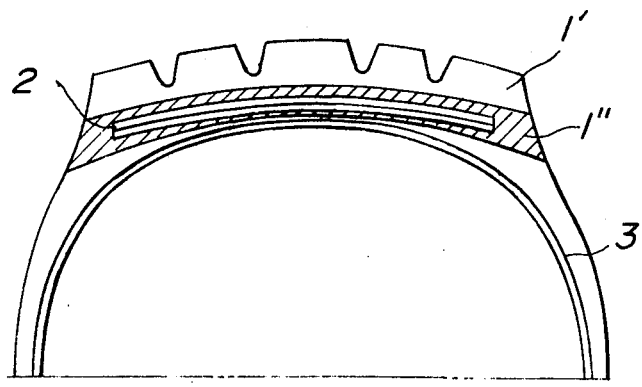
FIG. 1B is a cross-sectional view of a tire provided with a tread having a cap-base structure.

FIG. 1A is a cross-sectional view of one embodiment of tires according to the present invention, which has a tread 1 having an integrated structure. FIG. 1B is a cross-sectional view of another embodiment of tires according to the present invention, which has a cap-base structured tread comprising a tread cap 1' and a tread base 1''. In FIGS. 1A and 1B, the numeral 2 represents a breaker and the numeral 3 represents a carcass.

The phenolic resin to be used in the present invention includes polycondensates of phenol, cresol or dimethylphenol with formaldehyde, alkyl($C_2$–$C_{10}$)phenolformaldehyde polycondensate, reaction prodcts of α- or β-pinene with phenol, and the like. The natural rosin series resin includes natural rosin, glycerine ester of rosin, polymerized rosin and the like.

When the amount of the natural rosin series resin or phenolic resin to be compounded to rubber used at least in the contact area of the tread with road surface or used in the tread cap is less than 1 part by weight, the effect of the resin does not appear. While, when the amount is more than 10 parts by weight, a large amount of heat is built up in the tread.

In the present invention, at least the contact area of tread with road surface or the tread cap is required to have a high wear resistance. Therefore, it is necessary that carbon black having a high reinforcing effect, which has an IA of more than 83 mg/g to 150 mg/g and a DBP of 80–120 ml/100 g, is compounded to a rubber used at least in the contact area of tread with road surface or used in the tread cap. When the amount of carbon black to be compounded to the rubber is less than 30 parts by weight, the rubber is not satisfactorily reinforced, while when the amount is more than 90 parts by weight, the carbon black is very difficult to be kneaded together with the rubber, can not be fully dispersed in the rubber and affects adversely the resistance against heat build-up of the rubber.

In the present invention, the tread base is not required to have an excellent wear resistance, but is required to have high withstand-voltage property and resistance against heat build-up. Therefore, carbon black having an IA of 40–83 mg/g and a DBP of 80–120 ml/100 g is preferably compounded to a rubber to be used in the tread base. When the amount of carbon black to be compounded to the rubber is less than 20 parts by weight, the rubber can not be satisfactorily reinforced so as to be used as a tread base, while when the amount is more than 50 parts by weight, a rubber composition having a sufficiently high resistance against heat build-up can not be obtained.

In the present invention, when natural rosin series resin or phenolic resin is compounded to a tread base rubber, it is preferable that the resin is compounded to the rubber in an amount of not larger than 3 parts by weight so that the resulting rubber composition has well-balanced withstand-voltage property and resistance against heat build-up and satisfy the use condition as a tread base rubber. The addition of the resin to the tread base rubber may be omitted depending upon the use condition of the rubber.

The present invention can be applied to any of bias tire, radial tire and semi-radial tire, which have a reinforcing layer reinforced with steel cords, organic fiber cords, glass cords or a combination of these cords.

In the present invention, the exemplification is made by the use of pneumatic tires, but of course, the present invention may be applied to tires filled with an elastmeric foam and other tires.

The following examples are given for the purpose of illustration of this invention and are not intended as limitations thereof.

EXAMPLE 1

A vulcanizable rubber composition consisting of 100 parts by weight of natural rubber, 30–50 parts by weight of carbon black shown in the following Table 1, 1–10 parts by weight of a softening agent shown in Table 1, 2 parts by weight of stearic acid, 1 part by weight of N-phenyl-N'-isopropyl-p-phenylenediamine, 2 parts by weight of zinc white, 1 part by weight of 2-(4'-morpholinodithio)benzothiazole, 2 parts by weight of sulfur was vulcanized at 150° C. for 30 minutes under a pressure of 80 kg/cm$^2$ to produce a vulcanizate. The hardness (Hd.), elongation at break (Eb.), tensile strength (Ts.), 300% modulus (300 Mod.), resilience (resil.), wear resistance and withstand-voltage property of the resulting vulcanizates were measured, and the obtained results are shown in Table 1.

TABLE 1(a)

| Rubber Sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Composition (parts by weight) | | | | | | | | | | | | | | | | |
| Natural rubber | 100 | 100 | 100 | 100 | 100 | 100 | 100 | 100 | 100 | 100 | 100 | 100 | 100 | 100 | 100 | 100 |
| ISAF carbon black *1 | 50 | 50 | 50 | 50 | 50 | 50 | 50 | 50 | 50 | 50 | | | | | | |
| SAF carbon black *2 | | | | | | | | | | | 50 | | | | | |
| HAF carbon black *3 | | | | | | | | | | | | 30 | 30 | 30 | | |
| FEF carbon black *4 | | | | | | | | | | | | | | | 30 | 30 |
| Natural resin | | 1 | 3 | 5 | 10 | | | | | | 3 | | 3 | 5 | | 3 |
| Sumilit resin *5 | | | | | | 3 | | | | | | | | | | |
| Hitanol 1501 *6 | | | | | | | 3 | | | | | | | | | |
| Aroma oil | | | | | | | | 3 | | | | | | | | |
| Spindle oil | | | | | | | | | 3 | | | | | | | |
| ECR 8080 *7 | | | | | | | | | | 3 | | | | | | |
| Stearic acid | 2 | 2 | 2 | 2 | 2 | 2 | 2 | 2 | 2 | 2 | 2 | 2 | 2 | 2 | 2 | 2 |
| N-Phenyl-N'-isopropyl-p-phenylenediamine | 1 | 1 | 1 | 1 | 1 | 1 | 1 | 1 | 1 | 1 | 1 | 1 | 1 | 1 | 1 | 1 |
| Zinc white | 4 | 4 | 4 | 4 | 4 | 4 | 4 | 4 | 4 | 4 | 4 | 4 | 4 | 4 | 4 | 4 |
| 2-(4'-morpholinodithio)benzothiazole | 1 | 1 | 1 | 1 | 1 | 1 | 1 | 1 | 1 | 1 | 1 | 1 | 1 | 1 | 1 | 1 |
| Sulfur | 2 | 2 | 2 | 2 | 2 | 2 | 2 | 2 | 2 | 2 | 2 | 3 | 3 | 3 | 3 | 3 |

*1: IA 119 mg/g, DBP 112 ml/100 g
*2: IA 136 mg/g, DBP 110 ml/g
*3: IA 80 mg/g, DBP 103 ml/100 g
*4: IA 41 mg/g, DBP 112 ml/100 g
*5: Alkylphenol-formadehyde polycondensate (made by Sumitomo Kagaku Co.)
*6: Phenol-formaldehyde polycondensate (made by Hitachi Kasei Co.)
*7: Cyclopentadiene series resin (made by Esso Co.)

TABLE 1(b)

| Rubber Sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Property | | | | | | | | | | | | | | | | |
| Hd. (°) | 64 | 65 | 67 | 69 | | 68 | 60 | 61 | 61 | 60 | 67 | 56 | 59 | 62 | 54 | 54 |
| Eb. (%) | 420 | 430 | 460 | 475 | 492 | 445 | 461 | 440 | 438 | 465 | 465 | 510 | 535 | 555 | 490 | 510 |
| Ts. (kg/cm$^2$) | 255 | 250 | 242 | 238 | 221 | 250 | 245 | 250 | 251 | 252 | 260 | 227 | 215 | 203 | 208 | 203 |
| 300 Mod. (kg/cm$^2$) | 160 | 152 | 130 | 122 | 115 | 140 | 132 | 147 | 148 | 138 | 131 | 100 | 90 | 81 | 105 | 93 |
| Resil. (%) | 62.0 | 60.0 | 57.0 | 52.0 | 49.0 | 58.0 | 56.0 | 60.0 | 59.0 | 57.5 | 54.0 | 72 | 65 | 59 | 78 | 73 |
| Wear resistance (index) | 100 | 95 | 85 | 60 | 30 | 78 | 83 | 90 | 87 | 80 | 100 | 35 | 20 | 15 | 25 | 18 not |

TABLE 1(b)-continued

| Rubber Sample No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Withstand-voltage property (V) | 50 | 400 | 1400 | 2500 | 2500 | 1300 | 1200 | 100 | 100 | 450 | 1000 | 3500 | 4000 | 4500 | 4500 | less than 5000 |

In the above described measurement, the hardness, elongation at break, tensile strength, 300% modulus and resilience were measured according to the method described in JIS K6301.

The wear resistance was measured and estimated in the following manner. The pico wears of rubber samples are measured according to the method described in ASTM D 2228. The pico wear of rubber sample No. 1 containing no softening agent was calculated as an index 100 of wear resistance, and that of each rubber sample was comparatively shown by an index based on the index 100 of rubber sample No. 1.

The withstand-voltage property of rubber was measured in the following manner by means of a withstand-voltage tester (FN-TESTER, TYPE 504 AT.N, made by Toyoko Vehicle Co.). A rectangular test piece having a dimension of 30 cm×6 cm×5 cm was cut out from each rubber sample, and both ends of the test piece were held with alligator-shaped clips. A voltage was applied to the test piece through the clips and raised gradually. When the voltage exceeded a certain value, an electric current began to flow in the test piece, and when the voltage was further raised, the rubber was broken and began to burn. The voltage, at which the rubber began to burn, was measured.

EXAMPLE 2

Tires of 1000 R 20, 14PR size, which had a tread having a structure A or B shown in FIG. 1A or 1B, respectively, were produced by the use of rubber sample Nos. 1, 3, 5, 6, 12, 13, 14 and 15 shown in Table 1. The wear resistance, withstand-voltage property and resistance against heat build-up of the resulting tires were tested. The following Table 2 shows the results.

the tread portion of the tire with the other alligator-shaped clips.

In the test of wear resistance of tires, the tires were run on a paved road at an average speed of 40 km/hr. After 40,000 km running, the amounts of tread wear of the tires were measured. When tires had a tread having an integrated structure as shown in FIG. 1A, the amount of tread wear of tire No. 1 was calculated as an index 100, and those of tire Nos. 2 and 3 were comparatively shown by an index based on the index 100 of tire No. 1. When tires had a tread having a cap-base structure as shown in FIG. 1B, the amount of tread wear of tire No. 4 was calculated as an index 100, and those of tire Nos. 5, 6 and 7 were comparatively shown by an index based on the index 100 of tire No. 4.

The resistance against heat build-up of tires was measured in a room kept at 38° C. by means of a drum tester having a diameter of 1.7 m. A thermocouple was inserted from the shoulder portion into the tread of the tire at a position of above 5 mm of the breaker, and the temperature of the tread was measured under a load of 2,370 kg at a revolution rate of the drum of 56 km/hr. When tires had a tread having an integrated structure as shown in FIG. 1A, the heat generated in tire No. 1 was calculated as an index 100, and those generated in tire Nos. 2 and 3 were comparatively shown by an index based on the index 100 of tire No. 1, and when tires had a tread having a cap-base structure as shown in FIG. 1B, the heat generated in tire No. 4 was calculated as an index 100, and those generated in tire Nos. 5, 6 and 7 were comparatively shown by an index based on the index 100 of tire No. 4.

What is claimed is:

1. A withstand-voltage tire having a cap-base struc-

TABLE 2

| | Structure A | | | Structure B | | | |
|---|---|---|---|---|---|---|---|
| Rubber sample No. used in tread (cap/base) | Tire No. 1 Comparative example Sample No. 1 | Tire No. 2 Present invention Sample No. 3 | Tire No. 3 Present invention Sample No. 5 | Tire No. 4 Comparative example Sample No. 1/ sample No. 12 | Tire No. 5 Comparative example Sample No. 3/ sample No. 14 | Tire No. 6 Present invention Sample No. 3/ sample No. 15 | Tire No. 7 Present invention Sample No. 6/ sample No. 13 |
| Withstand-voltage property (V) | 150 | 400 | 1,500 | 300 | 5,000 (30mA) | 5,000 (30mA) | 4,500 |
| Wear resistance (index) | 100 | 85 | 30 | 100 | 85 | 85 | 80 |
| Resistance against heat build-up (index) | 100 | 92 | 797 | 100 | 101 | 87 | 92 |

It can be seen from Table 2 that tire Nos. 2, 3, 6 and 7 according to the present invention have a remarkably improved withstand-voltage property and further have satisfactorily high wear resistance and resistance against heat build-up for practical use.

The above described tests were carried out in the following manner.

The withstand-voltage property of a tire was measured by the use of the same withstand-voltage tester as used in Example 1 by holding the bead portion of the tire with one of the alligator-shaped clips and holding ture tread comprising a thread cap and a tread base, said tread cap having a thickness of at least ½ of the thickness of the tread or extending to a position below a line connecting the groove bottoms of the tread patterns, and said tread cap being made of a rubber composition consisting of 100 parts by weight of a rubber selected from the group consisting of natural rubber, polyisoprene rubber, styrene-butadiene copolymer rubber, polybutadiene rubber and blends thereof, 1-10 parts by weight of at least one softening agent selected from the group consisting of natural rosin, glycerine ester of rosin, polymerized rosin and a phenolic resin, and 30-90 parts by weight of carbon black having an iodine adsorbability of from more than 83 mg/g to 150 mg/g and a dibutyl phthalate absorbability of 80-120 ml/100 g, and said tread base being made of a rubber composition consisting of 100 parts by weight of a rubber selected from the group consisting of natural rubber, polyisoprene rubber, polybutadiene rubber and blends thereof, 0-3 parts by weight of at least one softening agent selected from the group consisting of natural rosin, glycerine ester of rosin, polymerized rosin and a phenolic resin, and 20-50 parts by weight of carbon black having an iodine adsorbability of 40-83 mg/g and a dibutyl phthalate absorbability of 80-120 ml/100 g.

2. A withstand-voltage tire according to claim 1, wherein the amount of the at least one softening agent used in the tread cap is 1-5 parts by weight.

3. A withstand-voltage tire according to claim 1, wherein said carbon black used in the tread cap has an iodine adsorbability of 110-150 mg/g and a dibutyl phthalate absorbability of 100-120 ml/100 g.

4. A withstand-voltage tire according to claim 1, wherein the amount of said carbon black used in the tread cap is 40-50 parts by weight.

5. A withstand-voltage tire according to claim 1, wherein said carbon black used in the tread base has an iodine adsorbability of 30-50 mg/g and a dibutyl phthalate absorbability of 100-120 ml/100 g.

6. A withstand-voltage tire according to claim 1, wherein the amount of said carbon black used in the tread base is 30-40 parts by weight.

* * * * *